United States Patent Office 3,645,958
Patented Feb. 29, 1972

3,645,958
METHOD OF MAKING SHAPED ARTICLES FROM FIBERS BONDED WITH OIL-RESISTANT SYNTHETIC RUBBER
Henry Joseph Palumbo, Middlesex, N.J., assignor to Johns-Manville Corporation, New York, N.Y.
No Drawing. Filed May 20, 1968, Ser. No. 730,603
Int. Cl. C08c 11/22
U.S. Cl. 260—33.6 A                    7 Claims

ABSTRACT OF THE DISCLOSURE

Shaped articles, such as sheets, made of fibers bonded together by an oil-resistant synthetic rubber, e.g., GRN rubber, are formed by working a dough containing the fibers and rubber into the required shape while evaporating solvent. The dough is prepared by mixing the fibers, plus other rubber compounding materials such as vulcanizing agents, with the oil-resistant rubber that has been previously solvated by soaking for at least several hours in an organic softening liquid diluent in which the rubber is at least substantially insoluble, and then working the mixture into a uniform softened mass by agitation. Sheets formed from the dough may typically be used for gaskets, flange packing, and the like.

BACKGROUND OF THE INVENTION

It is conventional practice to use rubbers or other elastomers as bonding agents for fibers in the formation of shaped articles such as sheets, rods, tubes, panels and the like. This present invention is concerned with methods of making such shaped products with particular reference to the formation of compressed asbestos sheet packings using an oil-resistant rubber, such as GRN rubber, as the bonding material for the asbestos fibers.

The combining of elastomeric binder with fibers in the formation of shaped products has been conventionally carried out by two general procedures. In one of these, an aqueous emulsion or latex of the elastomeric binder (in the form of a liquid suspension) is combined with the fibers in some suitable manner and the aqueous phase of the emulsion or latex is subsequently evaporated or otherwise removed from the fiber and elastomeric mass. In the other general method, the elastomer is dissolved in a solvent to form a so-called "cement" which is then combined in suitable manner with fibers as a step in the formation of the final desired shaped products. In the case of compressed asbestos sheet packing, the normal procedure is to break down the rubber or elastomer on a mill or Banbury mixer and then make the cement by dissolving the broken down rubber in a solvent. In the case of butadiene-acrylonitrile rubber (GRN rubber), relatively expensive and often toxic solvents are required to form the cement, e.g., nitromethane, nitroethane, 1-nitropropane, ethylene dichloride, chlorobenzene, methyl ethyl ketone, methyl isobutyl ketone, trichloroethylene, acetone and ethyl acetate. The need to use such solvents to produce the desired bonding cement increases the cost of manufacture, requires the use of special systems to recover the solvent during the manufacturing operations, and is often accompanied by problems of the undesirable toxicities.

It would be advantageous to industrial manufacturers that make shaped products from fibers bonded by oil-resistant elastomers to have available some improved methods which would avoid the requirement for use of expensive solvents and the normal procedure used in the trade of making such products by forming a solvent cement from the elastomer as a step in production of the shaped rubber bonded fiber products.

OBJECTS

A principal object of the present invention is the provision of improvements in methods of making shaped products from fibers bonded together by oil-resistant elastomers or mixtures thereof. Further objects include the provision of:

(1) New methods of making fluid masses of oil-resistant elastomers which may be mixed with fibers to form a dough composition (or comparable workable mass) to be formed into a predetermined shape.

(2) New methods of producing compressed asbestos sheet packing from asbestos fibers bonded with an oil-resistant rubber.

(3) Improved techniques for the processing of GRN rubber, or mixtures thereof with other polymer rubbers, to form a flowable mass from the rubber and a relatively inexpensive organic volatile solvent to reduce the costs and eliminate dangers of toxic solvents in the normal procedure used heretofore by the trade in the making of GRN bonded compressed asbestos sheet packing.

(4) Improved plastic compositions for use in forming in the production of oil-resistant rubber-bonded compressed asbestos sheet packing.

(5) Information to enable the industrial users of oil-resistant rubbers to improve fabricating operations in which such rubber is required to be mixed with fibers in the formation of shaped products such as compressed asbestos sheet packing.

(6) An improved shaped oil-resistane rubber-bonded asbestos sheet packing.

Other objects and further scope of applicability of the present invention will become apparent from the preceding and following disclosure which, while indicating preferred embodiments of the invention, is given by way of illustration only, since various changes and modifications within the spirit and scope of the invention will become apparent to those skilled in the art from this detailed description.

SUMMARY OF THE INVENTION

The objects of the invention are accomplished as a result of the novel method of making of shaped products comprising a formed composition of fibers bonded together by an oil-resistant rubber, formed from a plastic dough composition (or comparable shapeable mass) comprising fibers and elastomer uniformly dispersed, together with an organic liquid dispersed therein. The plastic composition is formed into a predetermined shape by any convenient mechanical working of the plastic composition, while preferably simultaneously evaporating the liquid diluent. The liquid diluent alternatively may be evaporated after the forming step, in a less preferred embodiment. The process of making the plastic composition comprises soaking for at least about 24 hours, preferably at least about 48 hours, a quantity of butadiene-acrylinitrile rubber in a preferably volatile organic liquid diluent capable of solvating the rubber, i.e., capable of causing the rubber to become softened (and usually to swell), and working the solvated rubber, i.e., the admixture of the liquid diluent and the rubber, into a plastic mass, i.e., a substantially uniform flowable mass by agitation. There is no critical maximum soaking time. The uniform mass is in the nature of a paste or gel, hereafter referred to as a plastic dough. This plastic dough of homogeneously dispersed rubber and preferably volatile liquid i.e., a truly plastic composition, can be compounded (admixed) with fibers and suitable other agents such as conventional vulcanizing agents, conventional anti-oxidants and the like, to form a modified plastic dough composition (or comparable mechanically workable mass). This modified plastic composition may be formed into a sheet or other predetermined shape and solidified into the predetermined desired product by removal, such as by evaporation of the liquid and/or volatile compounds of the dough.

The new method and novel composition employ a synthetic rubber that is a copolymer of acrylonitrile and butadiene, i.e., so-called GRN rubber, or mixtures thereof with other elastomers. It is further advantageous to use an aromatic liquid hydrocarbon as a preferred softening liquid diluent, such as toluene or xylene, as the rubber-softening organic liquid in the formation of the plastic composition comprising the solvent and rubber binder mixture and the thereafter modified plastic dough or other workable mass comprising the plastic elastomer composition and fibers.

The success of the present invention is due, at least in part, to the discovery that superior properties in the shaped products made of the rubber bonded fibers may be obtained through the combination of the new rubber liquid diluent mixing procedure with the subsequent steps of forming the fiber and rubber article forming composition and shaping of such composition. The precise cause of this improvement in properties is not known, but it may be due to the manner in which the rubber when solvated in this manner combines with the fibers as opposed to the association of rubber with fibers from a so-called solvent "cement." Additionally, the new methods result in simplification of the manufacturing operations because the oil-resistant rubber can be merely stored in cans, barrels or the like while the gel-like mixture forms. This eliminates tumbling mills and problems of cleaning them associated with the cement-type of operation. There are the additional advantages discussed above in the principal objects of the invention.

Although the new process of this invention may be employed in making any desired shape product from a plastic dough-like modified mass of elastomer and fibers, the process is advantageously used in accordance with the invention in the formation of compressed asbestos fiber sheets by the working of a plastic dough composition prepared as described, in the gap between and in contact with each of a pair of opposed rolls, one of which rolls is heated while the other is cooled, whereby the sheet is formed upon the heated roll as volatile liquid is evaporated from the dough as it is worked between the gap of the rolls.

In a preferred embodiment, butadiene-acrylonitrile rubber (GRN rubber) is employed alone as the elastomer binder for modified plastic composition of asbestos fibers and such rubber. The elastomer is soaked for about 48 hours in at least about 40 percent by weight of aromatic liquid hydrocarbon until the mass is soft enough to agitate with a rotary stirrer and such admixture is agitated preferably for at least about five minutes before being mixed with asbestos fiber in the formation of a mechanically workable dough. In such preferred operations, the modified plastic dough composition will advantageously, aside from the aromatic liquid hydrocarbon content, consist essentially of the following non-diluent ingredients, aside from solvent (diluent) content, in the indicated weight percentages:

GRN rubber—about 10% to about 50%
Asbestos fibers—about 25% to about 80%
Fillers—about 5% to about 25%
Rubber compounding materials—about 1% to about 10%

DESCRIPTION OF PREFERRED EMBODIMENTS

The following details of operations in accordance with the invention and reported data illustrate the further principles and practice of the invention to those skilled in the art. In these examples, as well as throughout the specification and claims, all parts and percentages are by weight and all temperatures are in degrees centigrade, unless otherwise specified.

EXAMPLE I

This example concerns production of compressed asbestos sheet packing from asbestos fibers bonded with GRN rubber.

As a first step in the compressed sheet packing production, a nitrile rubber of an intermediate acrylonitrile content such as "Paracril BJ" was milled for approximately 15 minutes on a rubber mill and sheeted out as a thin sheet about one-quarter inch in thickness. This particular nitrile rubber has about 28 percent acrylonitrile content. The sheeted rubber was then placed in a container and covered with aromatic hydrocarbon solvent, i.e., "Solvesso No. 1" a trademark of the Standard Oil Co. of New Jersey for a petroleum derived solvent with a boiling range of about 205 to 294° F. and a specific gravity of about 0.835, and the sheeted rubber was allowed to soak in this solvent for 48 hours. The soaking resulted in a softening of the rubber. At the end of the soaking period, the contents of the container were transferred to an internal propeller blade type mixer, i.e., a "Ross mixer," and this mass was mixed for 5 minutes to produce a uniform jelly-like material. The resulting soft gel was then divided into two portions. To the first portion, rubber compounding ingredients and well opened asbestos fibers were slowly added while the mass was worked vigorously in the mixer. This composition was designated "A" and the actual ingredients forming the composition are listed in the table given below.

The mass of fibers, rubber compounding ingredients, solvent and softened rubber were agitated in the mixer for approximately one hour until a uniform plastic mass, frequently referred to in the trade as a dough, was obtained. During the mixing, additional solvent was added so that the final plastic mass consisted of 50 percent solvent and 50 percent other ingredients.

The resulting dough-like mass was placed between the two rolls of a so-called sheeter machine, one of the rolls being heated with steam to maintain the temperature of the roll within the range of 95 to 140° C. The other roll was cooled with cold water to maintain its temperature between about 10–30° C. As the dough was forced through the gap between the two rolls, a sheet was formed on the surface of the hot roll and the volatile liquid component of the dough was volatilized from the surface of the sheeted dough adjacent to the hot surface of the roll. The resulting sheeted fiber compound adhered to the surface of the hot roll forming a sheet continuously around the roll. As the mechanical working of the dough progressed, the two rolls were separated automatically to increase the opening or gap between them and allow the continuous sheet to build up to a predetermined thickness, namely, 1⁄32 of an inch. The rolling operation proceeded for approximately 6 minutes, at which time the sheet was cut from the hot roll and placed upon a flat support for cooling and further processing.

In a similar manner, the second half of the softened nitrile rubber was mixed with a different quantity of asbestos fibers and rubber compounding ingredients as indicated in the folowing table under the heading "B." In the same manner as with the composition "A," this second dough was then worked into a thin sheet.

The resulting sheets were cut into suitable shapes and used as packing between flanges in high pressure pipe and tubing systems. The compressed sheet packings were found to create a tight joint between the flanges with no leakage problems. Furthermore, upon disassembly of the systems, it was found that the packing sheets separated readily and cleanly from the flange surfaces which had been in contact with the sheet packing.

The sheet packings prepared as described above were formed of the following ingredients in the percentages by weight indicated:

| Ingredient, percent | Product A | Product B |
|---|---|---|
| GRN rubber ("Paracril BJ") | 7.80 | 12.00 |
| GRS 1012 rubber (butadiene styrene) | 5.20 | 3.00 |
| Zinc oxide (powdered) | 9.10 | 8.95 |
| Sulfur | 0.30 | 0.61 |
| Tetramethyl thiuram disulfide | 0.23 | 0.46 |
| Mercaptobenzothiazole | 0.11 | 0.21 |
| Phenyl-beta-naphthylamine | 0.21 | 0.21 |
| Carbon black (powdered) | 1.33 | 1.40 |
| Asbestos fibers—4TO4 grade (Q.A.M.A. standard) | 75.72 | 62.11 |
| Asbestos fibers—7MO6 grade (Q.A.M.A. standard) | | 11.05 |
| Total | 100.00 | 100.00 |

For purposes of illustration of some of the advantageous properties of this invention, properties of a "Product A" resulting from the composition "A" are as follows:

| Product A | 1/32 n. thickness | 1/16 in thickness |
|---|---|---|
| Average tensile strength | 4,450 | 5,200 |
| Compression at 5,000 p.s.i. | 14.2 | 11.3 |
| Recovery | 52.1 | 55.3 |
| Weight per square yard | 2.5 | 5.1 |

EXAMPLE 2

The following ingredients were used in the weight percentages listed to make compressed asbestos fiber sheet packing:

|  | Percent |
|---|---|
| GRS 1012 rubber | 3.0 |
| GRN rubber ("Paracril BJ") | 12.0 |
| Zinc oxide | 9.0 |
| Sulfur | 0.6 |
| Tetramethyl thiuram disulfide | 0.5 |
| Mercaptobenzothiazole | 0.2 |
| Phenyl-beta-naphthylamine | 0.2 |
| Carbon black (powdered) | 1.4 |
| Asbestos fibers | 73.1 |
|  | 100.0 |

The GRN rubber was milled for about 10 minutes and the GRS rubber then added and milling continued for about 5 minutes. The total batch of about 430 pounds was soaked in 32 gallons of aromatic hydrocarbon solvent for 4 days. The resulting soft gel was transferred to a "Ross" mixer and mixed for about 5 minutes. Then all other ingredients but the asbestos fiber were added and the mass mixed for 10 minutes. This was followed by gradual addition of the fiber over a period of 30 minutes with 10 gallons of solvent being added at 15 minutes and another 10 gallons at the end of the 30 minutes. The mass was mixed another 15 minutes and 10 more gallons of solvent were added and mixing continued for 15 minutes.

The resulting dough was sheeted on a sheeter machine with the hot drum heated to about 125° C. to form both 1/32 inch thickness and 1/16 inch thickness compressed asbestos sheet packing. Standard ASTM (American Standard Test Method) P-1141-A tests on the resulting products produced the following data:

|  | 1/32 in. thickness | 1/16 in. thickness |
|---|---|---|
| Normal tensile (avg.) | 6,875 | 5,740 |
| Compression percent (5,000 p.s.i.) | 7.3 | 9.9 |
| Percent recovery (5,000 p.s.i.) | 56.4 | 56.3 |
| Weight per square yard | 2.90 | 5.25 |
| Stress relaxation, 22 hr. at 212° F., 3,000 p.s.i. | 16.2 | |

DISCUSSION OF DETAILS

The new methods of the invention may be used to make shaped article for fibers bonded by elastomers, e.g., sheets, rods, tubes, panels or the like. Furthermore, any desirable type of fibers may be used in combination with any suitable elastomer. However, the new methods are of particular advantage in forming sheets from asbestos fibers bonded with oil-resistant synthetic rubbers including GRN rubber, neoprene or comparable elastomers used as fiber binders and possessing greater resistance to solvents than natural rubber.

The new methods are particularly useful in forming compressed asbestos sheet packing as classified by standard ASTM designation D-1170 and made by the so-called sheeter process. Prior art compressed sheets will typically have a compression of about 5 to about 15 percent when tested under 5,000 p.s.i. load and in the 1/32 inch thickness will have a weight of about 2 to about 3 pounds per square yard. However, the findings and discoveries of this invention make it possible to produce such asbestos packing sheets with superior properties as compared to the conventional methods, e.g., superior tensile strength, recovery, stress relaxation, and low porosity.

The composition from which the sheets or other shaped products are formed may comprise a single oil-resistant elastomer or combinations of these or combinations with non-resistant rubbers. A preferred elastomer for use in the invention is the GRN type rubbers, i.e., rubbery copolymers of acrylonitrile, and butadiene. Alternatively, one may additionally use any one or more of other synthetic elastomers such as GRS rubber, ethylene-propylene polymer elastomers, terpolymers of ethylene, propylene and non-conjugated diene and other types of synthetic rubbers known to the art to be useful in the formation of compressed asbestos packing sheets, in combination with the GRN rubber, provided at least about 55 percent, preferably at least 80 percent, of the total weight of elastomer is GRN rubber. Advantageously, the elastomeric polymer content of the new packing sheets will be about 10 percent to 50 percent of the total product.

In a preferred composition of the invention for the making of sheet packing, asbestos fibers are employed. In a typical normal situation, normal asbestos fiber such as crysotile asbestos fiber is employed. As used in this specification and in the appended claims, the term asbestos is intended to include, in addition to crysotile fibers, other commercial varieties of fibers such as anthophyllite, actinolite, tremolite, crocidolite, amosite, various amphibole fibers and Canadian picrolite. Various grades may be used with the Quebec Asbestos Mining Association standards and the amount of asbestos used in the molded compound may vary between about 25 percent and about 80 percent by weight, with a preferred range of about 50 percent to about 75 percent.

The compositions used in forming the new compressed asbestos packing sheets may also contain additional ingredients which may be combined under a general heading as rubber compounding ingredients. Such components are essentially conventional in the art of making compressed asbestos sheets and will include fillers, vulcanizing agents, vulcanizing accelerators, anti-oxidants, stabilizers and the like. Advantageously, the total quantity of these rubber compounding ingredients will together amount to 6 percent to 35 percent of the sheet-forming compositions, exclusive of any volatile solvents.

Any one of a variety of fillers may be used to modify the composition, such as graphite, carbon black, silica sand, mica, talc, clay, diatomaceous silica, perlite, barytes (barium sulfate), small amounts of other fibers, and similar filler compositions. The percentage range of filler may vary between about 5 percent and about 25 percent and the amount should be dictated to some extent by the amount of asbestos fibers which is employed; for an increase of fiber content, there is a decrease in filler content, for example.

The more effective sulfur accelerators are the thiuram mono-, di-, or tetra-sulfides and the metal salts of dithiocarbamic acid. A thiazole is desirable as a secondary accelerator to develop satisfactory cure rates. Various other materials may be used as the curing agents including mercaptobenzothiazole and the peroxides such as dicumyl peroxide.

An organic liquid rubber-softening diluent, preferably volatile, constitutes another essential component of the new methods for creation of the initial solvated rubber mass and in the subsequent formation of the dough or plastic mass used to form the packing sheets or other desired products. A variety of softener organic liquids are available for this purpose. The critical requirement of the liquid diluent to be employed is that at least about 90 percent of the liquid diluent must be a liquid in which the butadiene-acrylonitrile rubber is insoluble, if the liquid diluent consists of this particular liquid in admixture emulsion, or solution with one or more solvents in which the rubber is highly soluble. An additional requirement is that a liquid diluent employed alone, or that the total liquid diluent comprising an admixture of liquid diluents, be characterized by a softening action on the butadiene-acrylonitrile rubber, when the rubber is soaked therein. A liquid diluent employed alone, or a total liquid diluent of two or more liquid diluents and/or solvents, characterized by the above-described maximum rubber solubility of about 10 percent, will inherently have the critical softening action of the process of this invention. In a preferred embodiment, the liquid diluent(s) employed is (are) volatile, and thereby easily removed. Advantageously, one uses an aromatic liquid hydrocarbon softener diluent having a boiling point below about 150° C. and preferably between about 50 to about 140° C. Each of toluene and xylene is a typical liquid diluent in which the rubber is sbustantially insoluble and in which the rubber becomes softened. Commercial solvents containing a high percentage of aromatic hydrocarbon which are recommended typically include "Solvesso No. 1." For example, the organic liquid that is used to soften the rubber, should normally be capable of producing a perceptible swelling of the rubber when in contact therewith for at least about 24 hours or longer. The suitability of any organic liquid for use in the new methods may be easily determined by suitable test bearing in mind the general softening principle disclosed above.

The proportion of the preferably volatile organic liquid used may be varied and will depend in part upon the ratio of fibers to rubber, the particular rubber used and the like. In forming the initial rubber gel, one may advantageously use between 0.5 to 5 parts of the organic liquid for each part of rubber. In the fiber and rubber composition used to form the sheet packing or other desired product, one may advantageously use between about 0.5 to about 10 parts of organic liquid for each part of total weight of other components and especially 1 to 5 parts of liquid for each such part of other components.

No special fabrication equipment is required in carrying out the methods of the invention. For the preferred methods of the invention, compressed sheet-forming machines are standard equipment used to produce compressed asbestos sheets as encompassed by standard ASTM designation D–1170. Accordingly, the improvements afforded by the invention may be readily adopted by established manufacturing facilities and handled by established personnel.

What I claim is:
1. In a method of making shaped products comprising fibers bonded together by an oil-resistant rubber wherein a dough comprising said fibers and rubber together with an organic liquid diluent comprising an aromatic liquid hydrocarbon may be formed into a predetermined shape by mechanical working of the dough, and the diluent may be removed therefrom, the improvement which comprises (1) soaking for at least about 24 hours particles of a rubber comprising at least 55 percent butadiene-acrylonitrile rubber by weight of total rubber, said butadiene-acrylonitrile rubber ranging from about 20 percent to about 40 percent acrylonitrile content, in an organic liquid diluent characterized by a softening action on the rubber and by substantial insolubility of said rubber in said diluent, and (2) agitating the liquid and the rubber particles into a substantially uniform mass, said diluent comprising at least about 40 percent of said mass by weight up to about 90% of said mass by weight.

2. A method as claimed in claim 1 wherein said organic liquid diluent is a volatile diluent, and in which said method includes forming said mass into said predetermined shape, and removing said diluent from the uniform mass, whereby a shaped product results.

3. A method as claimed in claim 2 wherein said shaped products are sheets, and wherein said removing comprises evaporating said liquid diluent substantially during the forming step.

4. A method as claimed in claim 1 wherein the products are sheets made by working the dough in the gap between a pair of opposed rolls, one of the rolls being heated to a temperature between about 95 to about 200° C. and the other roll is cooled to maintain it at a temperature between about 10 to about 50° C.

5. A method as claimed in claim 1 wherein said aromatic liquid hydrocarbon is selected from the group consisting of toluene and xylene, and substituted forms thereof.

6. A method as claimed in claim 1 wherein said method includes soaking butadiene-acrylonitrile rubber for about 24 hours in said organic liquid diluent at least until the mass is soft enough to agitate with a rotary stirrer and wherein said method includes agitating the softened mass for at least about 5 minutes before admixing asbestos fiber in amount of about 25 to 80 percent therewith in the formation of said dough, and wherein the resulting dough is worked between opposed rollers to form compressed asbestos sheet packing about $\frac{1}{32}$ to about $\frac{1}{4}$ inch in thickness.

7. A method as claimed in claim 6 wherein said dough, aside from organic liquid diluent content, consists essentially of ingredients in weight percentages described below:

Butadiene-acrylonitrile rubber—about 10% to about 50%
Asbestos fibers—about 25% to about 80%
Fillers—about 5% to about 25%
Rubber compounding materials—about 1% to about 10% and wherein said butadiene-acrylonitrile rubber includes an acrylonitrile content ranging from about 25 percent to about 30 percent.

References Cited

UNITED STATES PATENTS

| | | | |
|---|---|---|---|
| 2,992,200 | 7/1961 | Maly | 260—33.6 A |
| 3,307,969 | 3/1967 | Quinn | 117—126 AB |
| 3,500,603 | 3/1970 | Strack | 260—41.5 A |

OTHER REFERENCES

Hofmann: Rubber Chemistry and Technology, 36 (#5), December 1963 (suppl.), pages 154–160 and 214–217.

MORRIS LIEBMAN, Primary Examiner

H. H. FLETCHER, Assistant Examiner

U.S. Cl. X.R.

117—126 AB, 260—34.2, 41.5 A; 264—211